(12) United States Patent
Harada (10) Patent No.: US 7,839,455 B2
(45) Date of Patent: Nov. 23, 2010

(54) IMAGE PROCESSING APPARATUS, IMAGE DISPLAY AND IMAGE PROCESSING METHOD

(75) Inventor: Shigeru Harada, Tokyo (JP)

(73) Assignee: Sony Corporation, Tokyo (JP)

( * ) Notice: Subject to any disclaimer, the term of this patent is extended or adjusted under 35 U.S.C. 154(b) by 1160 days.

(21) Appl. No.: 11/458,223

(22) Filed: Jul. 18, 2006

(65) Prior Publication Data

US 2007/0046827 A1 Mar. 1, 2007

(30) Foreign Application Priority Data

Aug. 26, 2005 (JP) ............................. 2005-246611

(51) Int. Cl.
*H04N 5/14* (2006.01)
*H04N 5/202* (2006.01)
*H04N 5/52* (2006.01)

(52) U.S. Cl. .................. 348/672; 348/674; 348/678

(58) Field of Classification Search ......... 348/671–672, 348/674–675, 678–679, 602–603, 687, 624, 348/645–646; 382/168–169, 172; 358/518–519, 358/522, 521; *H04N 5/14, 5/202, 5/52*
See application file for complete search history.

(56) References Cited

U.S. PATENT DOCUMENTS 5,289,282 A * 2/1994 Tsuji et al. ............... 348/624
5,546,134 A * 8/1996 Lee ......................... 348/673
6,040,860 A    3/2000 Tamura et al.
6,373,533 B1 * 4/2002 Kawabata et al. .......... 348/672
7,227,559 B2 * 6/2007 Aoki et al. ................ 345/690
2005/0128358 A1  6/2005 Nakajima et al.

FOREIGN PATENT DOCUMENTS

| EP | 1 494 462 A1 | 1/2005 |
|---|---|---|
| JP | 2001-391 | 1/2001 |
| JP | 2002-366121 | 12/2002 |
| JP | 2003-264849 | 9/2003 |
| JP | 2004-40808 | 2/2004 |
| JP | 2004-282377 | 10/2004 |
| JP | 2004-289746 | 10/2004 |
| JP | 2005-77950 | 3/2005 |

* cited by examiner

*Primary Examiner*—Trang U Tran
(74) *Attorney, Agent, or Firm*—Oblon, Spivak, McClelland, Maier & Neustadt, L.L.P.

(57) ABSTRACT

There is provided an image processing apparatus, an image display and an image processing method which are capable of preventing an unnatural change in image quality to image processing. A luminance distribution detecting circuit detects a luminance distribution as the histogram distribution of YUV signals. A gain calculating circuit and a gain limiter detect a gain variation on the basis of luminance distribution data. The gain limiter limits the gain variation to a gain variation threshold or less. The gain limiter and a delay circuit carry over the gain variation of a portion exceeding the gain variation threshold to the next image frame so as to modify the gain variation. A γ correction circuit performs image processing (contrast control) on the YUV signals on the basis of the gain variation modified.

14 Claims, 11 Drawing Sheets

IMAGE PROCESSING APPARATUS, IMAGE DISPLAY AND IMAGE PROCESSING METHOD

CROSS REFERENCES TO RELATED APPLICATIONS

The present invention contains subject matter related to Japanese Patent Application JP 2005-246611 filed in the Japanese Patent Office on Aug. 26, 2005, the entire contents of which being incorporated herein by reference.

BACKGROUND OF THE INVENTION

1. Field of the Invention

The present invention relates to an image processing apparatus having a function of performing an image quality correction process on an image signal, an image display and an image processing method.

2. Description of the Related Art

Typically, apparatuses such as television receivers, VTRs (Video Tape Recorders), digital cameras, television cameras or printers have an image processing function which makes an image quality correction to an input image, and outputs the input image (for example, functions such as luminance or contrast control, and contour correction). Such a function is effectively applied mainly to a totally dark and low-contrast image or a blurred image.

Among these functions, in general, the contrast control is performed by correcting a gamma curve which represents so-called gamma characteristics. In this case, the amount of correction which is set at each luminance (signal) level at the time of correcting the gamma curve is called gain.

For example, in Japanese Unexamined Patent Application Publication Nos. 2002-366121, 2004-40808 and 2004-282377, there are disclosed image processing techniques in which the luminance distribution of an input image is detected as a histogram distribution, and then image processing such as contrast control is performed on the input image on the basis of the histogram distribution. In these techniques, when specifically the gain is set to be large at a luminance level with a high frequency value, the overall contrast can be effectively improved.

SUMMARY OF THE INVENTION

Figure 14:
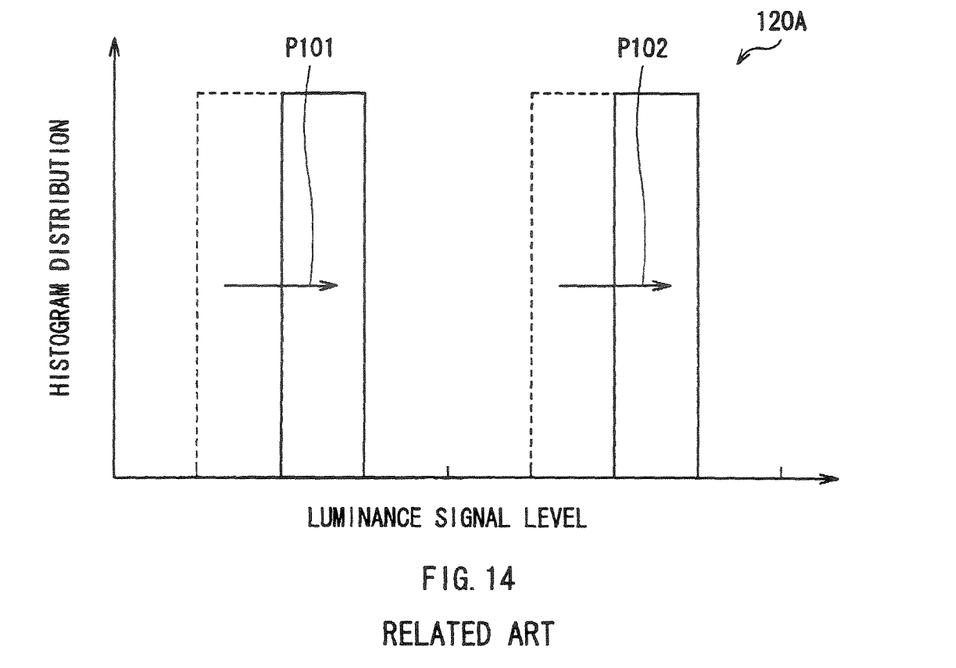
FIG. 14 is a plot for describing a change in distribution at a specific luminance level segment in the luminance distribution of an image display in a related art.
Figure 15:
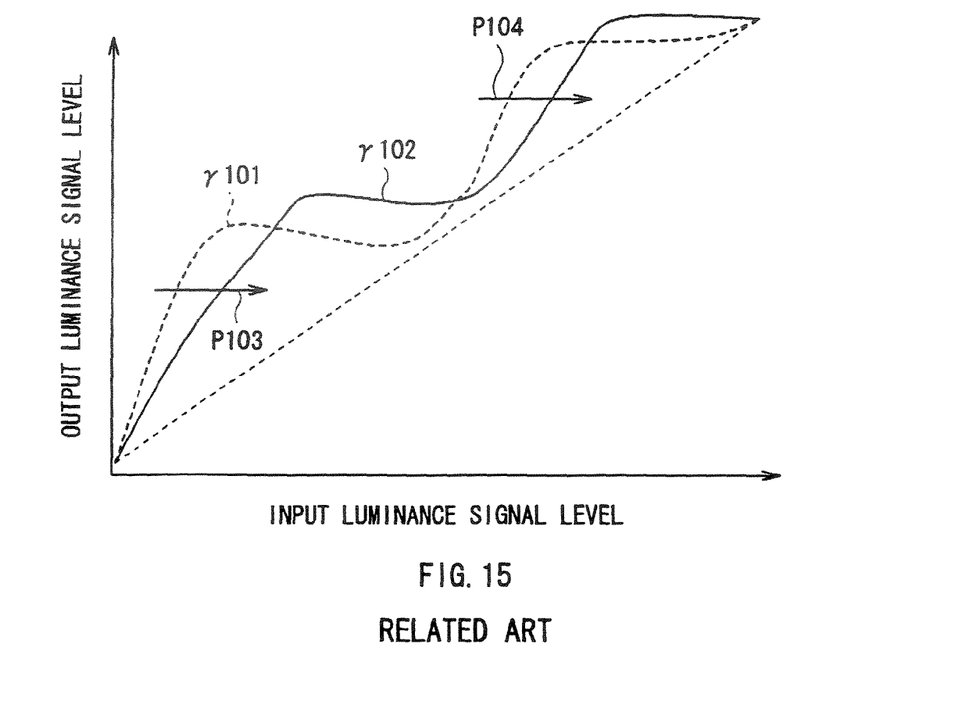
FIG. 15 is a plot for describing a change mode of a gamma curve by a change in distribution at a luminance level segment shown in FIG. 14.

However, in the techniques of Japanese Unexamined Patent Application Publication Nos. 2002-366121, 2004-40808 and 2004-282377, for example, as shown in FIG. 14, in the case where a luminance distribution 120A as a histogram distribution is concentrated on a specific luminance level segment, when the luminance level segment on which the luminance distribution 120A is concentrated is shifted as shown by arrows P101 and P102 in the drawing, even if the luminance level segment is slightly shifted, a large change in the result of image processing such as contrast control may occur. In other words, in the case where the luminance level segment on which the luminance distribution 120A is concentrated is shifted so as to straddle the border between luminance level segments, when image processing is performed on the basis of the histogram distribution, for example, as in the case of the contrast control shown in FIG. 15, a gamma curve γ101 before image processing and a gamma curve γ102 after image processing cause a large change in image quality (refer to arrows P103 and P104 in the drawing). Such a large change in image quality causes something wrong in the quality of a displayed image, thereby an unnatural image is displayed. Such an issue becomes pronounced specifically in the case where the number of luminance level segments is small.

Thus, in the techniques in the related arts, in the case where the luminance distribution as a histogram distribution is concentrated on a specific luminance level segment, there is an issue that image processing causes an unnatural change in image quality.

In view of the foregoing, it is desirable to provide an image processing apparatus, an image display and an image processing method which are capable of preventing an unnatural change in image quality due to image processing.

According to an embodiment of the invention, there is provided an image processing apparatus including: a finding means for finding a luminance histogram for every image frame of input image data; a gain-variation detecting means for detecting a gain variation between image frames on the basis of the found luminance histogram, the gain representing the level of image processing; a control means for limiting a gain variation in an image frame to a gain variation threshold in the case where the gain variation exceeds the gain variation threshold, and modifying the gain variation so that a portion exceeding the gain variation threshold is carried over to a gain variation in the next image frame; and an image processing means for performing image processing on the input image data on the basis of the gain variation modified. In addition, "an image frame" means image data constituting one screen. Further, "carried over" means to be added to the gain variation in the next image frame, and, for example, in the case where a gain variation detected in the next image frame exists, "carried over" means to be added to the gain variation.

In this case, it is preferable that the image processing apparatus further includes an APL (average picture level) variation detecting means for detecting an APL variation between image frames of the input image data, wherein the control means changes the threshold level on the basis of an APL variation detected by the APL variation detecting means.

According to an embodiment of the invention, there is provided an image display including: a finding means for finding a luminance histogram for every image frame of input image data; a gain-variation detecting means for detecting a gain variation between image frames on the basis of the found luminance histogram, the gain representing the level of image processing; a control means for limiting a gain variation in an image frame to a gain variation threshold in the case where the gain variation exceeds the gain variation threshold, and modifying the gain variation so that a portion exceeding the gain variation threshold is carried over to a gain variation in the next image frame; an image processing means for performing image processing on the input image data on the basis of the gain variation modified, thereby generating a processed image data; and a display means for displaying an image on the basis of the processed image data.

According to an embodiment of the invention, there is provided a image processing method including the steps of: finding a luminance histogram for every image frame of input image data; detecting a gain variation between image frames on the basis of the found luminance histogram, the gain representing the level of image processing; limiting a gain variation in an image frame to a gain variation threshold in the case where the gain variation exceeds the gain variation threshold, and modifying the gain variation so that a portion exceeding the gain variation threshold is carried over to a gain variation in the next image frame; and performing image processing on the input image data on the basis of the gain variation modified.

In the image processing apparatus, the image display and the image processing method according to the embodiment of the invention, a luminance histogram for every image frame of the input image data is found, and a gain variation between image frames is detected on the basis of the found luminance histogram. Moreover, in the case where the gain variation in an image frame exceeds a gain variation threshold, the gain variation is limited to the gain variation threshold, and the gain variation is modified so that a portion exceeding the gain variation threshold is carried over to the gain variation in the next image frame. Then, on the basis of the modified gain variation, image processing is performed on the input image data.

In the image processing apparatus, the image display or the image processing method according to the embodiment of the invention, a luminance histogram for every image frame of the input image data is found; a gain variation between image frames is detected on the basis of the found luminance histogram; in the case where the gain variation in an image frame exceeds a gain variation threshold, the gain variation is limited to the gain variation threshold, and the gain variation is modified so that a portion exceeding the gain variation threshold is carried over to the gain variation of the next frame; and image processing is performed on the input image data on the basis of the modified gain variation, so an unnatural change in image quality due to image processing can be prevented.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
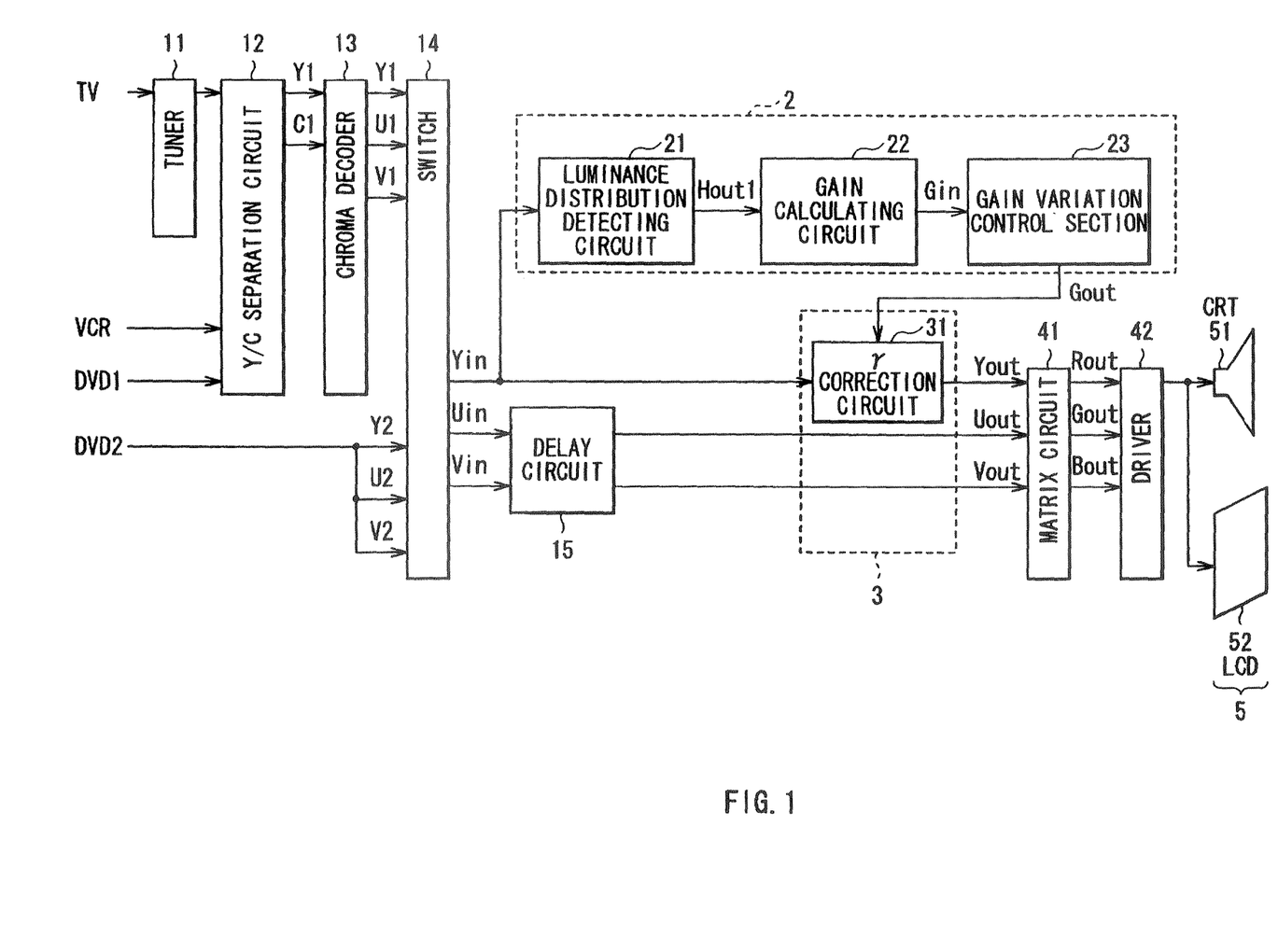
FIG. 1 is a circuit block diagram of the whole structure of an image display according to a first embodiment of the invention.

FIG. 1 shows the whole structure of an image display according to a first embodiment of the invention. The image display includes an image processing function section including a tuner 11, a Y/C separation circuit 12, a chroma decoder 13, a switch 14, a delay circuit 15, a gain producing section 2 and a image processing section 3 and an image display function section including a matrix circuit 41, a driver 42 and a display 5. An image processing apparatus and an image processing method according to a first embodiment of the invention are embodied by the image display according to the embodiment, so they will be also described below.

Image signals inputted into the image display may be an output from a VCR (Video Cassette Recorder), a DVD (Digital Versatile Disc) or the like in addition to a TV signal from a TV (television). It has become common practice for recent televisions and personal computers to obtain image information from a plurality of kinds of media and display an image corresponding to each of the media.

The tuner 11 receives and demodulates the TV signal from the TV, and outputs the TV signal as a composite video burst signal (CVBS).

The Y/C separation circuit 12 separates a composite signal from the tuner 11 or a composite signal from a VCR or a DVD1 into a luminance signal Y1 and a chrominance signal C1 to output them.

The chroma decoder 13 outputs the luminance signal Y1 and the chrominance signal C1 separated by the Y/C separation circuit 12 as YUV signals (Y1, U1, V1) including the luminance signal Y1 and color-difference signals U1 and V1.

The YUV signals are image data of a two-dimensional digital image, and a set of pixel values corresponding to a position on an image. A luminance signal Y represents a luminance level, and takes an amplitude value between a white level which is 100% white and a black level which is 100% black. Moreover, a 100% white image signal is 100 (IRE) in a unit called IRE (Institute of Radio Engineers) representing a relative ratio of an image signal. In NTSC (National Television Standards Committee) signal standards, the white level is 100 IRE, and the black level is 0 IRE. On the other hand, the color-difference signals U and V correspond to a signal B-Y produced by subtracting the luminance signal Y from blue (B) signal, and a signal R-Y produced by subtracting the luminance signal Y from red (R) signal, respectively, and when the signals U and V are combined with the luminance signal Y, colors (color phases, chroma saturation, luminance) can be shown.

The switch 14 switches YUV signals from a plurality of kinds of media (in this case, the YUV signals (Y1, U1, V1) and YUV signals (Y2, U2, V2) from a DVD2) so as to output selected signals as YUV signals (Yin, Uin, Vin).

The gain producing section 2 produces gain data Gout to be outputted to the γ correction circuit 31 in the image processing section 3 which will be described later, and includes a luminance distribution detecting circuit 21, a gain calculating circuit 22 and a gain variation control section 23.

The luminance distribution detecting circuit 21 detects a luminance distribution as a histogram distribution on the basis of the luminance signal Yin from the YUV signals (Yin, Uin, Vin) outputted from the switch 14.

Figure 2:
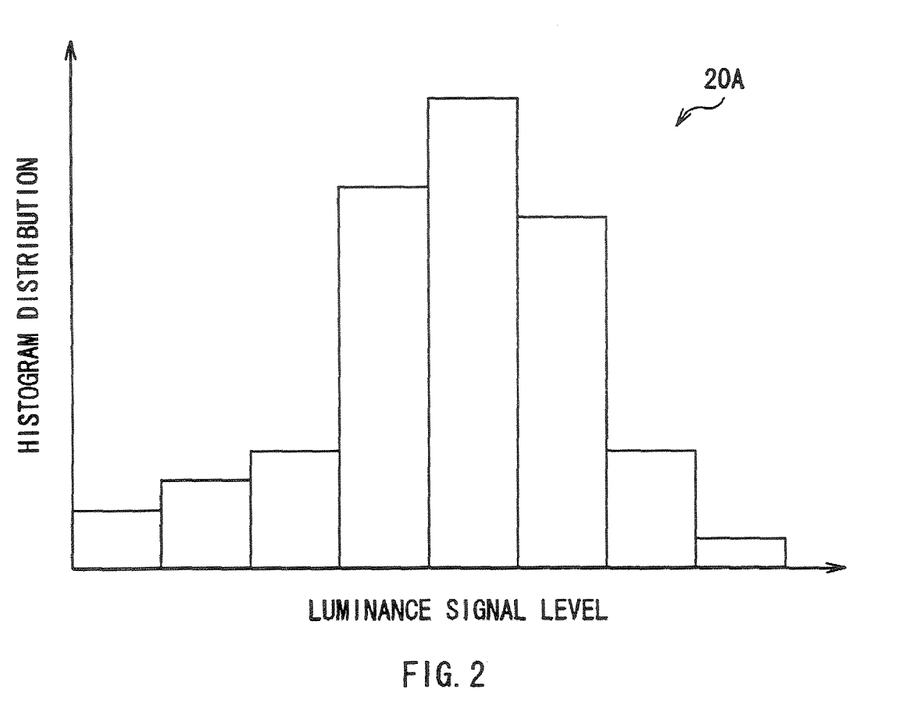
FIG. 2 is a plot for describing a luminance distribution.

FIG. 2 shows an example of a luminance distribution (a luminance distribution 20A) detected by the luminance distribution detecting circuit 21, and the vertical axis indicates frequency of the histogram distribution, and the horizontal axis indicates luminance level. Moreover, in the example of the luminance distribution 20A, the luminance level has 8 steps (8 gray levels). Luminance distribution data Hout1 representing the detected luminance distribution is outputted to the gain calculating circuit 22. The produced luminance distribution data Hout1 includes, for example, data for 1 frame when displaying an image or data of an image frame (image data constituting one screen) which is data for 1 field.

The gain calculating circuit 22 calculates gain data Gin which indicates the degree of contrast control in the γ correction circuit 31 on the basis of the luminance distribution data Hout1 outputted from the luminance distribution detecting circuit 21. More specifically, as a method of calculating the gain data Gin, referring to the luminance distribution data Hout1, the correction amount, that is, the gain data Gin at a luminance level with a large frequency value is set so as to be larger than that at a luminance level with a small frequency value. In other words, the variation at an output luminance level relative to a change at an input luminance level is large (refer to FIG. 7). When the gain data Gin is set in such a manner, as will be described later, the whole contrast is more effectively improved. The gain data Gin calculated in such a manner is outputted to the gain variation control section 23.

Figure 3:
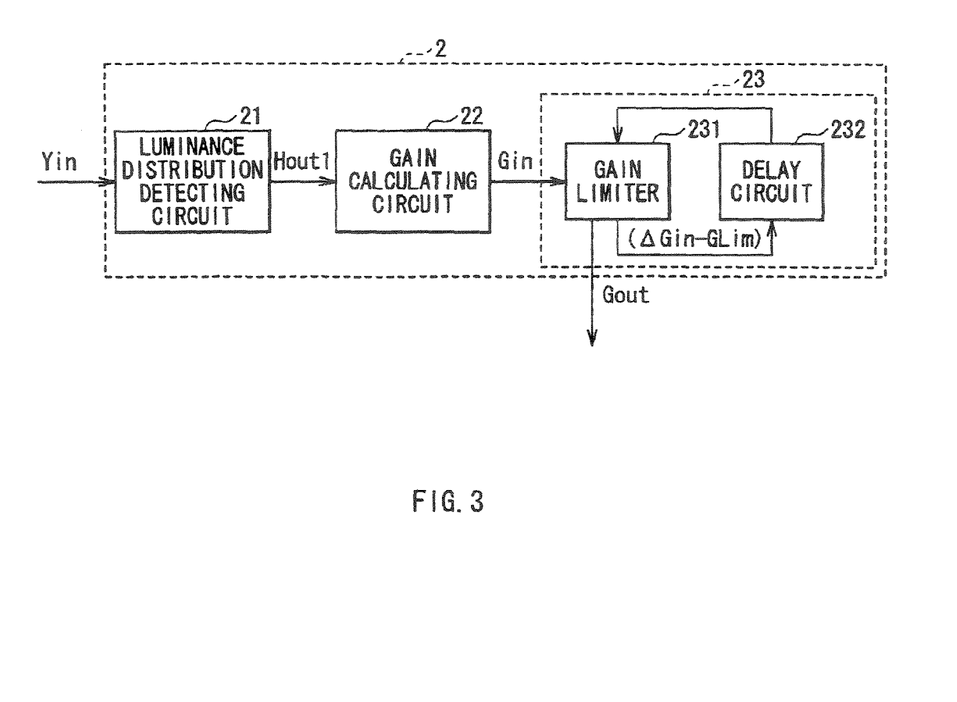
FIG. 3 is a circuit block diagram of the detailed structure of a gain producing section shown in FIG. 1.

FIG. 3 shows the detailed structure of the gain variation control section 23 in the gain producing section 2. The gain variation control section 23 includes a gain limiter 231 and a delay circuit 232.

The gain limiter 231 is a circuit detecting a gain variation ΔGin which is a variation between image frames of the gain data Gin on the basis of the gain data Gin calculated by the gain calculating circuit 22 and limiting the gain variation ΔGin to a predetermined threshold value (a gain variation threshold GLim). Moreover, when the gain variation ΔGin exceeds the gain variation threshold GLim, the delay circuit 232 delays data by a time per image frame (a unit time Δt), thereby a gain variation (ΔGin-GLim) of a portion exceeding the gain variation threshold GLim is carried over to the next image frame so as to control the gain variation ΔGin.

Figure 4A:
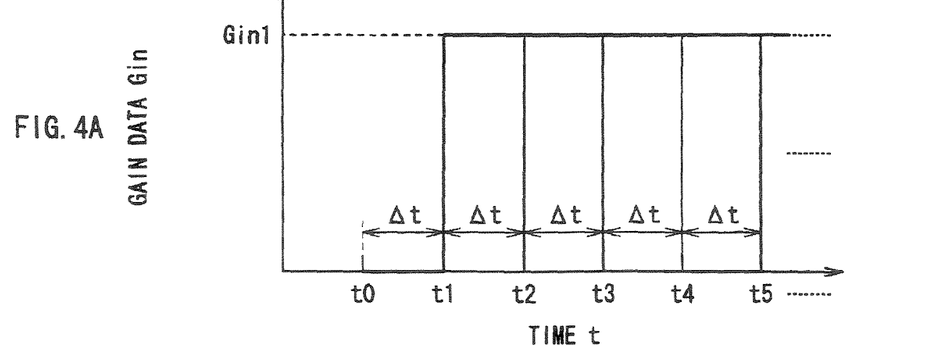
FIGS. 4A, 4B and 4C are timing charts for describing an example of the function of a gain variation control section shown in FIG. 1.
Figure 4B:
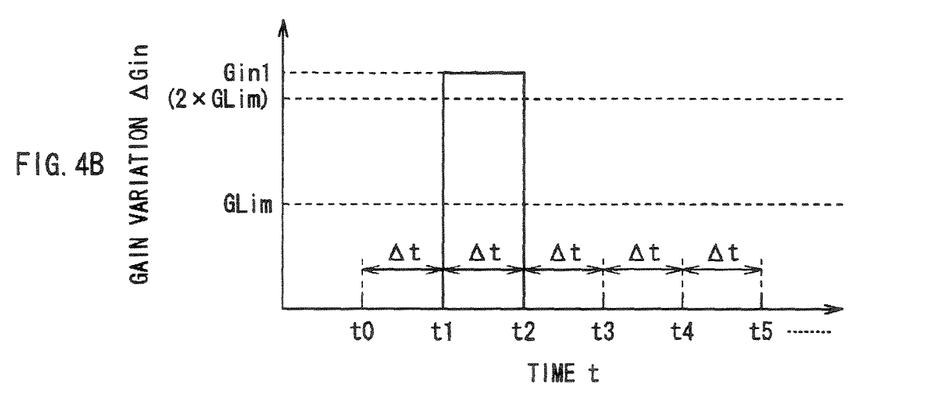
Figure 4C:
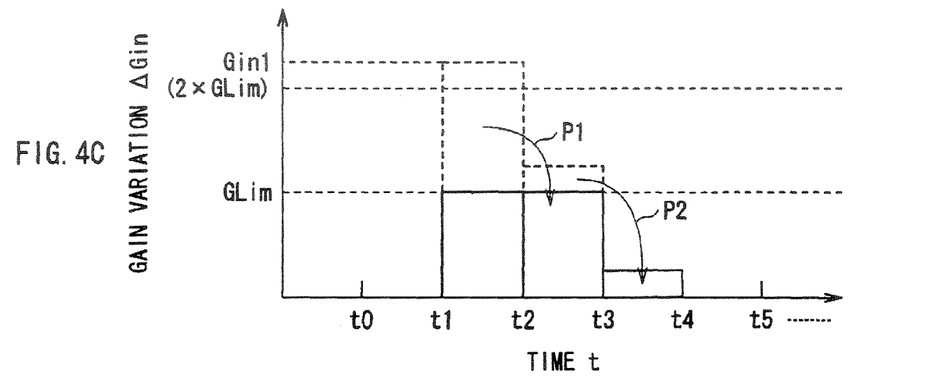
Figure 5:
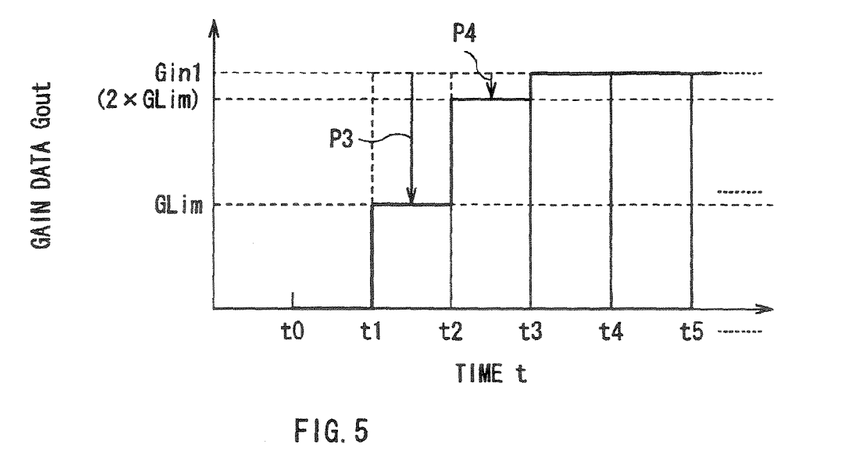
FIG. 5 is a timing chart for describing a change mode of a gain after the control of a gain variation shown in FIGS. 4A, 4B and 4C.

More specifically, for example, as shown in a timing chart of FIG. 4A, in the case where the gain data Gin inputted into the gain limiter 231 rapidly increases from 0 to Gin1 at a time t1, and keeps Gin1 since then, a change in the gain variation ΔGin detected by the gain limiter 231 is as shown in FIG. 4B. In these drawings, a time Δt between times t0, t1, t2, . . . corresponds to the above-described time per image frame (the unit time Δt). In this case, when the gain variation threshold GLim is set as shown in FIG. 4B, the gain limiter 231 limits the value Gin1 of the gain variation ΔGin to the gain variation threshold GLim. Then, as shown in FIG. 4C, the gain limiter 231 and the delay circuit 232 carry over the gain variation (Gin1-GLim) of a portion exceeding the gain variation threshold GLim between the times t1 and t2 to the next unit time Δt between the times t2 and t3 as shown by an arrow P1. Moreover, between the times t2 and t3, the carried gain variation (Gin1-GLim) exceeds the gain variation threshold GLim, so the gain limiter 231 limits the gain variation to the gain variation threshold GLim again, and the gain limiter 231 and the delay circuit 232 carry over the gain variation (Gin1−2× GLim) of a portion exceeding the gain variation threshold GLim to the next unit time Δt between the times t3 and t4 as shown by an arrow P2 in the drawing. Thus, the gain variation ΔGin is limited to the gain variation threshold GLim or less, and as shown by arrows P3 and P4 in FIG. 5, gain data Gout produced by controlling the original gain data Gin is outputted from the gain limiter 231 to the γ correction circuit 31 in the image processing section 3.

Figure 6A:
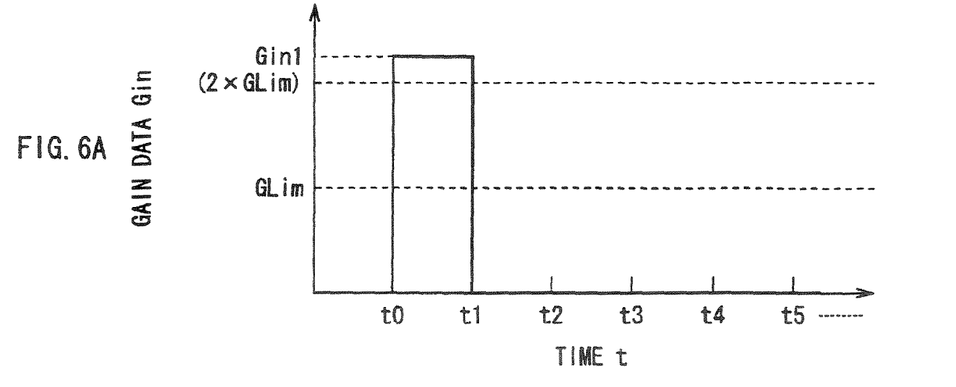
FIGS. 6A and 6B are timing charts for describing another example of the function of the gain variation control section shown in FIG. 1.
Figure 6B:
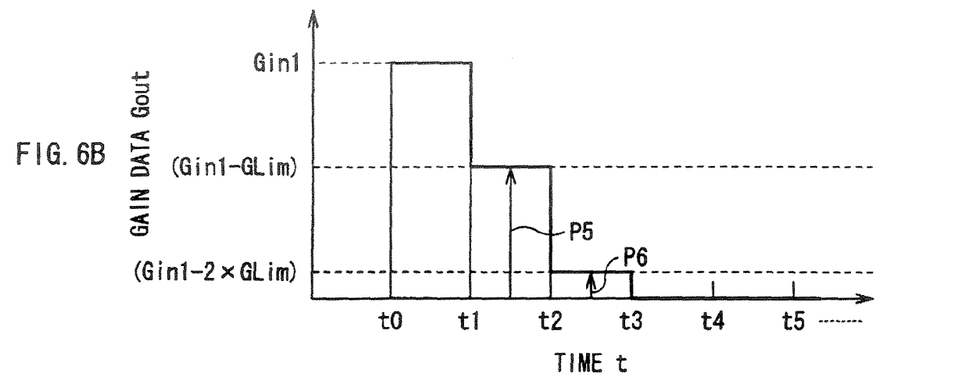

For example, as shown in FIG. 6A, in the case where the gain data Gin rapidly decreases from Gin1 to 0 at the time t0, and keeps 0 since then, the gain variation is controlled in the same manner as that described above, and as shown by arrows P5 and P6 in FIG. 6B, the gain data Gout produced by controlling the gain variation of the original gain data Gin is outputted from the gain limiter 231.

Referring back to FIG. 1, the delay circuit 15 delays the color-difference signals Uin and Vin outputted from the switch 14, and synchronizes the color-difference signals Uin and Vin and the gain data Gout outputted from the gain producing section 2 to output them to the image processing section 3.

The image processing section 3 performs predetermined image processing on the YUV signals (Yin, Uin, Vin) which are outputted from the switch 14 and pass through the delay circuit 15 through the use of the gain data Gout which is outputted from the gain producing section 2 and is produced by controlling the gain variation, and in the image display according to the embodiment, the image processing section 3 includes the γ correction circuit 31 performing a contrast improvement process on the YUV signals (Yin, Uin, Vin).

Figure 7:
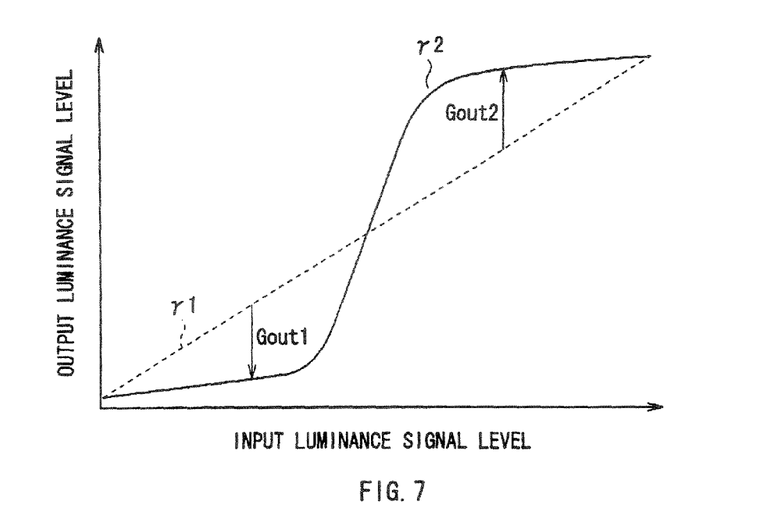
FIG. 7 is a plot for describing the function of a γ correction circuit shown in FIG. 1.

As described above, the γ correction circuit 31 performs a contrast improvement process on the YUV signals (Yin, Uin, Vin) through the use of the gain data Gout. More specifically, for example, as shown in input luminance level-output luminance level characteristics in FIG. 7, the contrast of an original γ curve γ 1 is controlled to a degree shown in the gain data Gout (for example, gain data Gout1, Gout2 in the drawing) on a luminance level basis. When the contrast is controlled in such a manner, for example, the γ curve γ 1 can be corrected to be a γ curve γ 2 in which a tilt at an intermediate luminance level is sharp and tilts at a low luminance level and a high luminance level is gentle, and the contrast can be improved specifically around a luminance level with a large frequency value (as shown in FIGS. 2 and 7, around the intermediate luminance level). Therefore, the contrast for the whole YUV signals (Yout, Uout, Vout) after image processing can be more effectively improved. The YUV signals (Yout, Uout, Vout) after image processing (controlling the contrast) are outputted to the matrix circuit 41.

The matrix circuit 41 reproduces RGB signals from the YUV signals (Yout, Uout, Vout) after image processing by the image processing section 3, and outputs the RGB signals (Rout, Gout, Vout) to the driver 42.

The driver 42 produces a driving signal for the display 5 on the basis of the RGB signals (Rout, Gout, Bout) outputted from the matrix circuit 41, and outputs the driving signal to the display 5.

The display 5 displays an image on the basis of the YUV signals (Yout, Uout, Vout) after image processing by the image processing section 3 according to the driving signal outputted from the driver 42. The display 5 may be any kind of display device, and for example, a CRT (Cathode-Ray Tube) 51, a LCD (Liquid Crystal Display) 52, a PDP (Plasma Display Panel; not shown) or the like is used.

In this case, the YUV signals (Yin, Uin, Vin) correspond to specific examples of "input image data" in the invention, and the YUV signals (Yout, Uout, Vout) correspond to specific example of "image processed data" in the invention. Moreover, the luminance distribution detecting circuit 21 corresponds to a specific example of "a finding means" in the invention, and the gain limiter 231 corresponds to a specific example of "a gain-variation detecting means" in the invention, and the gain limiter 231 and the delay circuit 232 correspond to specific examples of "a control means" in the invention. Further, the γ correction circuit 31 corresponds to a specific example of "an image processing means" in the invention.

Next, referring to FIGS. 1 through 7, the operation of the image display according to the embodiment will be described below.

At first, an image signal to be inputted into the image display is demodulated into the YUV signals. More specifically, a TV signal from the TV is demodulated into a composite signal by the tuner 11, and a composite signal is directly inputted into the image display from the VCR or the DVD1. Then, the composite signal is separated into the luminance signal Y1 and the chrominance signal C1 in the Y/C separation circuit 12, and then the luminance signal Y1 and the chrominance signal C1 are decoded into the YUV signals (Y1, U1, V1) in the chroma decoder 13. On the other hand, YUV signals (Y2, U2, V2) are directly inputted into the image display from the DVD2.

Next, in the switch 14, either the YUV signals (Y1, U1, V1) or the YUV signals (Y2, U2, V2) are selected to be outputted as the YUV signals (Yin, Uin, Vin). Then, the luminance signal Yin in the YUV signals (Yin, Uin, Vin) is outputted into the gain producing section 2 and the γ correction circuit 31 in the image processing section 3, and the color-difference signals Uin and Vin are outputted to the delay circuit 15.

In the gain producing section 2, the following operation of producing the gain data Gout is performed on the basis of the inputted luminance signal Yin.

More specifically, at first, in the luminance distribution detecting circuit 21, for example, a luminance distribution as a histogram distribution as shown in FIG. 2 is detected on the basis of the luminance signal Yin of the YUV signals (Yin, Uin, Vin) outputted from the switch 14, and the luminance distribution is outputted as luminance distribution data Hout1. Next, in the gain calculating circuit 22, on the basis of the luminance distribution data Hout1, the gain data Gin is calculated. In the gain variation control section 23, the gain variation ΔGin is detected from the gain data Gin in the gain limiter 231, and the gain variation ΔGin is limited to the gain variation threshold GLim or less. Moreover, in the case where the gain variation ΔGin exceeds the gain variation threshold GLim, the gain variation (ΔGin-GLim) of a portion exceeding the gain variation threshold GLim is carried over to the next image frame by the gain limiter 231 and the delay circuit 232. Thus, the gain data Gout after controlling the gain variation is produced, and is outputted from the gain producing section 2 to the image processing section 3.

On the other hand, in the delay circuit 15, the color-difference signals Uin and Vin are delayed, and as a result, they are synchronized with the gain data Gout outputted from the gain producing section 2.

Next, in the γ correction circuit 31 of the image processing section 3, on the basis of the luminance signal Yin outputted from the switch 14 and the color-difference signals Uin and Vin which are outputted from the switch 14 and pass through the delay circuit 15, the contrast improvement process is performed on the YUV signals (Yin, Yin, Vin) through the use of the gain data Gout supplied from the gain producing section 2. More specifically, the contrast is controlled to the degree shown in the gain data Gout on a luminance level basis.

In this case, the gain data Gout supplied from the gain producing section 2 is data after controlling the gain variation as described above. Therefore, even in the case where the gain Gin at a certain luminance level segment rapidly changes (increases or decreases) like, for example, the gain data Gin shown in FIGS. 4A and 6A by a DC shift in the luminance distribution concentrated on a specific luminance level segment, the gain variation ΔGin at the unit time Δt is limited to the gain variation threshold GLim or less, so a change between the YUV signals (Yin, Uin, Vin) unmodified and the YUV signals (Yout, Vout, Vout) modified is reduced, compared to the case where the gain data Gin under no modification in the gain variation is used.

Next, in the matrix circuit 41, the RGB signals (Rout, Gout, Bout) are reproduced from the YUV signals (Yout, Uout, Vout) after contrast processing, and the driver 42 produces the driving signal on the basis of the RGB signals (Rout, Gout, Bout), and an image is displayed on the display 5 on the basis of the driving signal.

As described above, in the embodiment, the luminance distribution detecting circuit 21 in the gain producing section 2 detects a luminance distribution as the histogram distribution of the YUV signals (Yin, Uin, Vin) outputted from the switch 14; the gain calculating circuit 22 and the gain limiter 231 in the gain variation control section 23 detect the gain variation ΔGin on the basis of the luminance distribution data Hout1; the gain limiter 231 limits the gain variation ΔGin to the predetermined gain variation threshold GLim or less; the gain limiter 231 and the delay circuit 232 carry over the gain variation (ΔGin-GLim) of a portion exceeding the gain variation threshold GLim to the next image frame so as to control the gain variation ΔGin; and the γ correction circuit 31 in the image processing section 3 performs image processing (contrast control) on the YUV signals (Yin, Uin, Vin) on the basis of the gain variation ΔGin after controlling the gain variation, so irrespective of the mode of the luminance distribution, an unnatural change in image quality due to image processing can be prevented.

Second Embodiment

Figure 8:
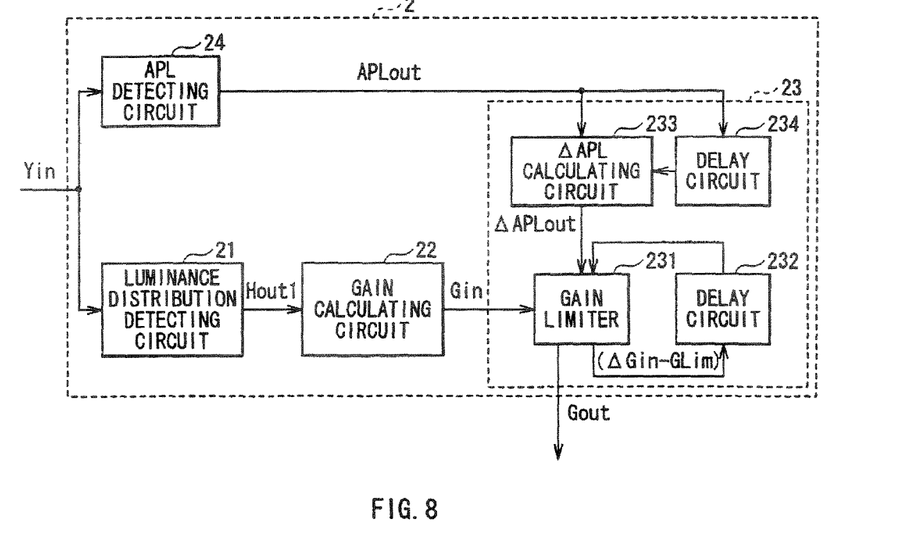
FIG. 8 is a circuit block diagram of the detailed structure of a gain producing section according to a second embodiment of the invention.

Next, a second embodiment of the invention will be described below. An image display according to the embodiment further includes an APL (Average Picture Level) detecting circuit 24 in the gain producing section 2 in the image display according to the first embodiment, and further includes a ΔAPL calculating circuit 233 and a delay circuit 234 in the gain variation control section 23.

FIG. 8 shows the structure of the gain producing section 2 according to the embodiment. The gain producing section 2 according to the embodiment includes the luminance distribution detecting circuit 21, the gain calculating circuit 22, the gain variation control section 23 and the APL detecting circuit 24. Moreover, the gain variation control section 23 includes the gain limiter 231, the delay circuit 232, the ΔAPL calculating circuit 233 and the delay circuit 234. Like components are denoted by like numerals as of the first embodiment and will not be further described.

The APL detecting circuit 24 detects the average picture level per unit data area (for example, per field) on the basis of the luminance signal Yin in the YUV signals (Yin, Uin, Vin) outputted from the switch 14. The detected average picture level APLout is outputted to the ΔAPL calculating circuit 233 and the delay circuit 234 in the gain variation control section 23.

The ΔAPL calculating circuit 233 detects a difference between the average picture level of a certain image frame (for example, average picture level APLout(n) of the nth (n; natural number) image frame) outputted from the APL detecting circuit 24 and the average picture level of the next image frame (for example, average picture level APLout(n+1) of the (n+1)th image frame), that is, an average picture level variation ΔAPLout (for example, ΔAPL(n+1)=APLout(n+1)−APLout(n)). Moreover, the delay circuit 234 delays the data of the average picture level APLout outputted from the APL detecting circuit 24 by a time per image frame (for example, the above-described unit time Δt) so as to supply the data to the ΔAPL calculating circuit 233.

In this case, the ΔAPL calculating circuit 233 corresponds to a specific example of "a APL (average picture level) variation detectign means" in the invention.

In the gain producing section 2 according to the embodiment, the following operation of producing gain data Gout is performed on the basis of the inputted luminance signal Yin.

At first, in the luminance distribution detecting circuit 21, the luminance distribution data Hout1 is detected on the basis of the luminance signal Yin, and the gain calculating circuit 22 calculates the gain data Gin on the basis of the luminance distribution data Hout1. Moreover, in the APL detecting circuit 24, the average picture level APLout of the image frame is detected on the basis of the luminance signal Yin, and the ΔAPL calculating circuit and the delay circuit 234 detects the average picture level variation ΔAPLout. Then, in the gain limiter 231, the gain variation ΔGin is detected from the gain data Gin, and the gain variation ΔGin is limited to the gain variation threshold GLim or less.

Figure 9:
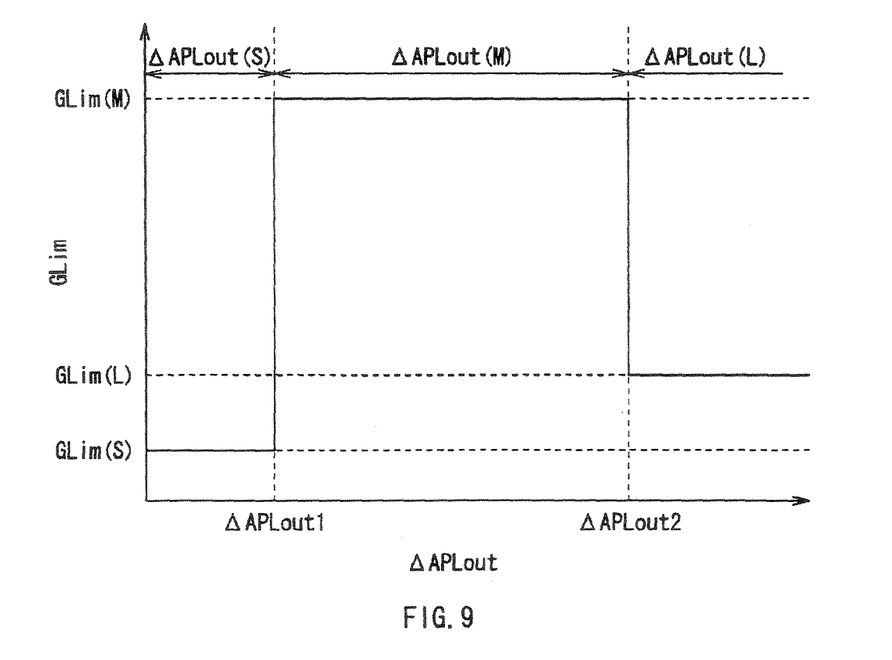
FIG. 9 is a plot for describing the function of a gain variation control section shown in FIG. 8.

In this case, the gain limiter 231 according to the embodiment changes the gain variation threshold GLim according to the average picture level amount ΔAPLout supplied from the ΔAPL calculating circuit 233. More specifically, for example, as shown in FIG. 9, the gain variation threshold GLim is set so as to be changed in a plurality of stages (in this case, 3 stages) in such a manner that in a small change area ΔAPLout(S) in which ΔAPLout<ΔAPLout1, the gain variation threshold GLim=GLim(S), in a middle change area ΔAPLout(M) in which ΔAPLout1≦ΔAPLout<ΔAPLout2, the gain variation threshold GLim=GLim(M), and in a large change area ΔAPLout(L) in which ΔAPLout2≦ΔAPLout, the gain variation threshold GLim=GLim(L). More specifically, the gain variation threshold GLim(S) in the small change area ΔAPLout(S) and the gain variation threshold GLim(L) in the large change area ΔPLout(L) are set be smaller than the gain variation threshold GLim(M) in the middle change area ΔAPLout(M). The small change area ΔAPLout(S), the middle change area ΔAPLout(M) and the large change area ΔAPLout(L) correspond to specific examples of "a first area", "a third area" and "a second area", respectively in the invention.

In the case where the gain variation threshold GLim is set in such a manner, in the small change area ΔAPLout(S), as in the case of the first embodiment, the gain variation ΔGin at the unit time Δt is limited to the gain variation threshold GLim(S) or less; therefore, for example, as shown in FIGS. 4A and 6A, even in the case where the gain Gin at a certain luminance level segment rapidly changes (increases or decreases), i.e. the gain variation ΔGin is large, by a slight DC shift in the luminance distribution concentrated on a specific luminance level segment, a change between the YUV signals (Yin, Uin, Vin) unmodified and the YUV signals (Yout, Uout, Vout) modified is reduced, compared to the gain data Gin under no modification in the gain variation is used. Moreover, even in the case where the gain variation threshold GLim(S) is set to be smaller than the gain variation threshold GLim(M) in the middle change area ΔAPLout(M) in such a manner, the aver-age picture level variation ΔAPLout is small (a DC shift is small), so an image on the basis of the YUV signals (Yout, Uout, Vout) after controlling the contrast is displayed naturally.

Moreover, in the middle change area ΔAPLout(M), the gain variation threshold GLim(M) is set so as to increase (cancel the limitation of the gain variation threshold GLim), and in the case where the average picture level variation ΔAPLout is large to a certain extent (a middle extent), the gain data Gout can be rapidly changed, so a change between the YUV signals (Yin, Uin, Vin) unmodified and the YUV signals (Yout, Uout, Vout) modified can follow a change in the average picture level, so unnatural prevention of a change in image quality can be avoided.

Moreover, in the large change area ΔAPLout(L), the gain variation threshold GLim(L) is set so as to decrease (control the gain threshold value GLim), so in the case where the average picture level variation ΔAPLout is large, for example, in the case where a scene is changed, the gain variation ΔGin is limited, and an unnatural change in image quality at the time of changing luminance is prevented.

Thus, in the embodiment, the gain producing section 2 includes the APL detecting circuit 24, the ΔAPL calculating circuit 233 and the delay circuit 234, and the gain limiter 231 changes the gain variation threshold GLim according to the average picture level variation ΔAPLout supplied from the ΔAPL calculating circuit 233, so in addition to the effects in the first embodiment, an unnatural change in image quality due to image processing can be more effectively prevented according to the average picture level variation.

Third Embodiment

Next, a third embodiment of the invention will be described below. An image display according to the embodiment further includes a leveling section 25 between the luminance distribution detecting circuit 21 and the gain calculating circuit 22 in the gain producing section 2 in the image display according to the first or the second embodiment. The following description is given on the basis of the gain producing section 2 according to the first embodiment shown in FIG. 1; however, the same holds true for the gain producing section 2 according to the second embodiment shown in FIG. 8.

Figure 10:
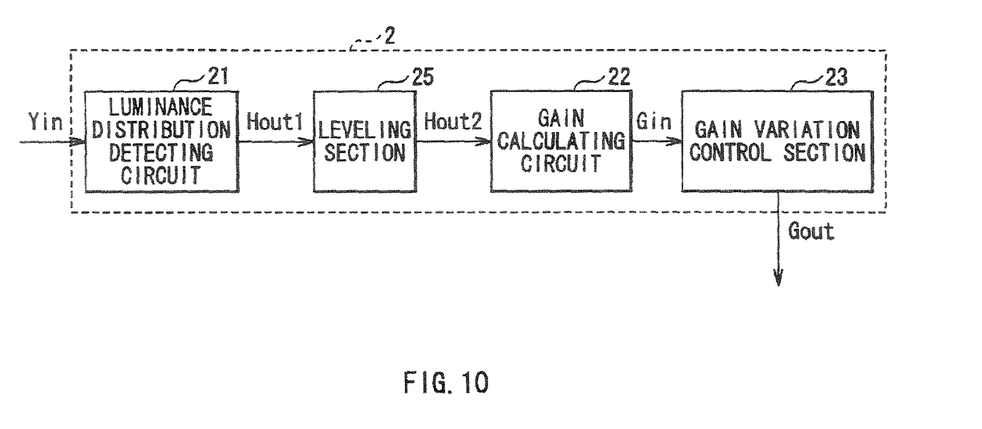
FIG. 10 is a circuit block diagram of the detailed structure of a gain producing section according to a third embodiment of the invention.

FIG. 10 shows the structure of the gain producing section 2 according to the embodiment. The gain producing section 2 according to the embodiment includes the luminance distribution detecting circuit 21, the leveling section 25, the gain calculating circuit 22 and the gain variation control section 23. Like components are denoted by like numerals as of the first embodiment and will not be further described.

The leveling section 25 includes a distribution limiter, a distribution filter or the like (not shown). The leveling section 25 corresponds to a specific example of "a leveling means" in the invention.

Figure 11A:
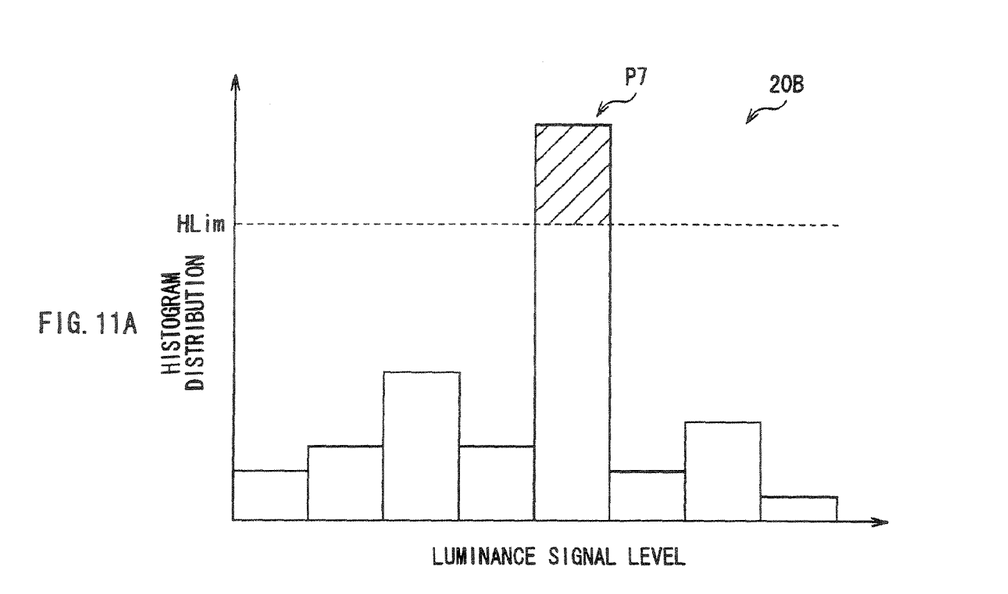
FIGS. 11A and 11B are plots for describing an example of the function of a leveling section shown in FIG. 10.
Figure 11B:
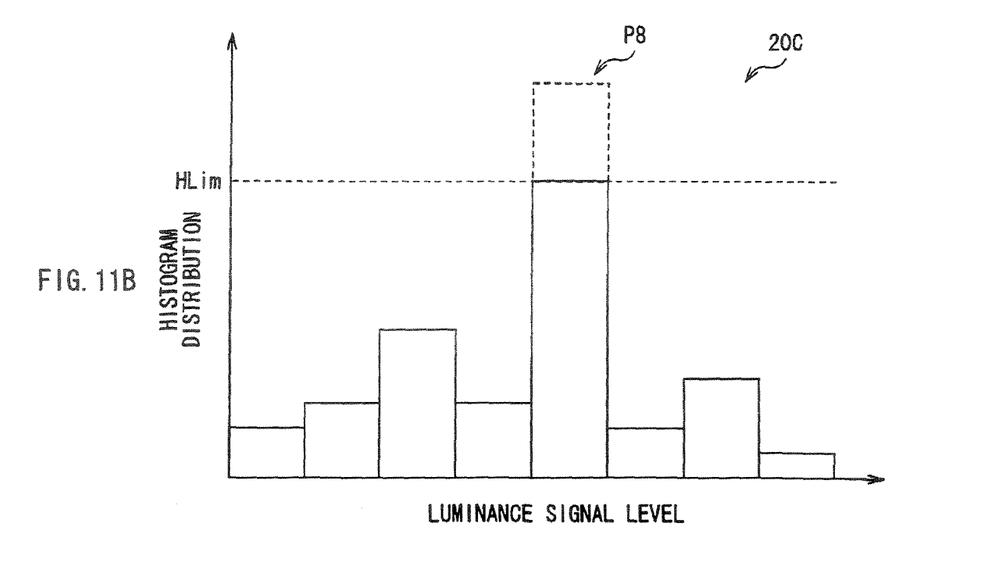

The distribution limiter is a circuit limiting the frequency of a histogram to a predetermined threshold value or less in the luminance distribution data Hout1 outputted from the luminance distribution detecting circuit 21. More specifically, for example, as shown by P7 in the luminance distribution 20B shown in FIG. 11A, in the case where the distribution is concentrated on a specific luminance level segment, and the frequency value is equal to or larger than a distribution threshold value HLim, as shown by P8 in the luminance distribution 20C shown in FIG. 11B, a frequency value equal to or larger than the distribution threshold value HLim is eliminated. Thereby, the concentration of the distribution on a specific luminance level segment in the histogram is reduced, and the distribution is leveled out. Thus, the leveled luminance distribution data Hout2 is outputted to the gain calculating circuit 23.

Figure 12:
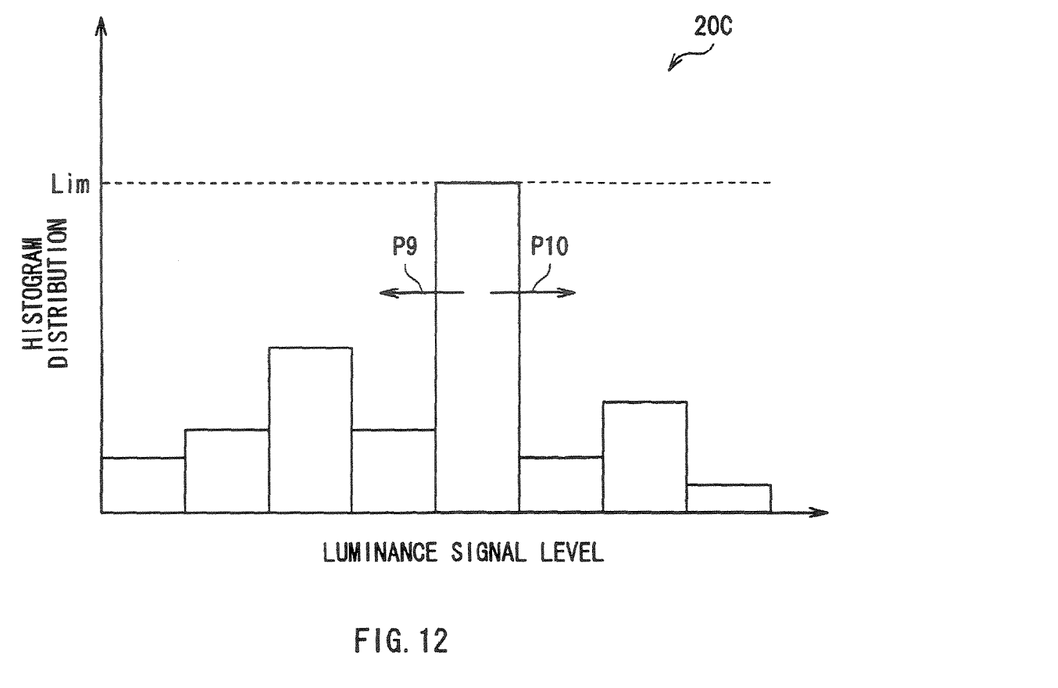
FIG. 12 is a plot for describing a change in distribution at a specific luminance level segment in a luminance distribution.

Thus, the gain data Gout supplied from the gain producing section 2 is based on the luminance distribution data Hout2 leveled out by the distribution limiter; therefore, for example, as in the case of the luminance distribution 20C shown in FIG. 12, even if the luminance level segment on which the distribution is concentrated is shifted as shown by arrows P9 and P10, a change between the YUV signals (Yin, Uin, Vin) unmodified and the YUV signals (Yout, Uout, Vout) modified is reduced, compared to the case where gain data based on the luminance distribution data Hout1 under no modification.

On the other hand, the distribution filter calculates a weighted average value with respect to each of a plurality of successive luminance level segments in the luminance distribution data Hout1 produced by the luminance distribution detecting circuit 21, and an original frequency value is replaced with the weighted average value, and the weighted average value is outputted as the luminance distribution data Hout2.

Figure 13A:
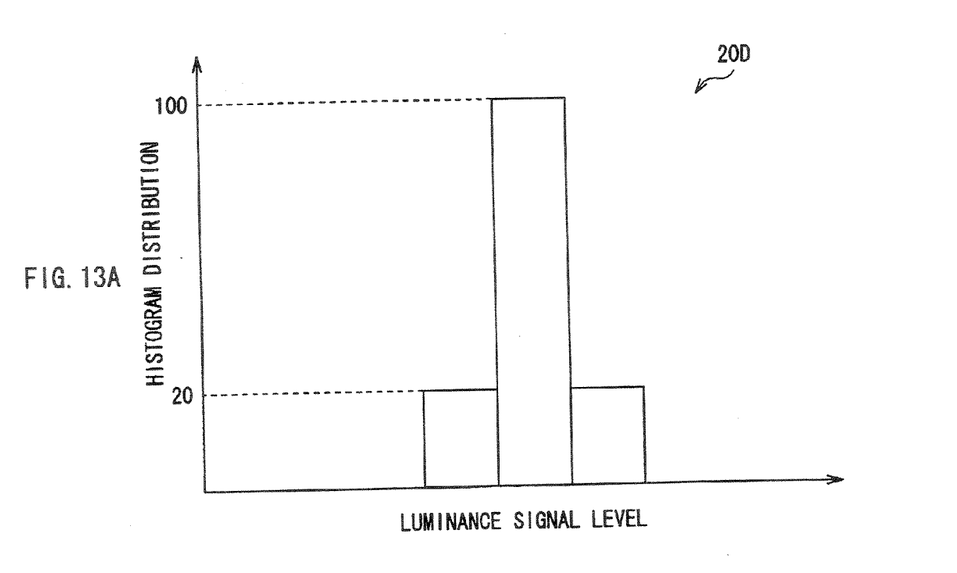
FIGS. 13A and 13B are plots for describing another example of the function of the leveling section shown in FIG. 10.

More specific description will be given below referring to, for example, luminance distributions 20D and 20E shown in FIGS. 13A and 13B, respectively. For example, as shown by the luminance distribution 20D shown in FIG. 13A, in the case where the frequency value at a certain luminance level segment (a luminance level segment on the left) is 20, the frequency value at a luminance level segment at the right of the luminance level segment (a luminance level segment in the middle) is 100, and the frequency value at a luminance level segment at the right of the luminance level segment in the middle (a luminance level segment on the right) is 20, that is, the distribution is concentrated on the luminance level segment in the middle, weighted average values Ave(left), Ave(middle) and Ave(right) at the luminance level segments with respect to each of a plurality of (three in this case) successive luminance level segments are calculated by the following formulas (1) through (3). Further, a weight in this case is (left:middle:right)=(1:2:1) as an example.

$$Ave(left)=(0\times1+20\times2+100\times1)/(1+2+1)=35 \quad (1)$$

$$Ave(middle)=(20\times1+100\times2+20\times1)/(1+2+1)=60 \quad (2)$$

$$Ave(right)=(100\times1+20\times2+0\times1)/(1+2+1)=35 \quad (3)$$

Figure 13B:
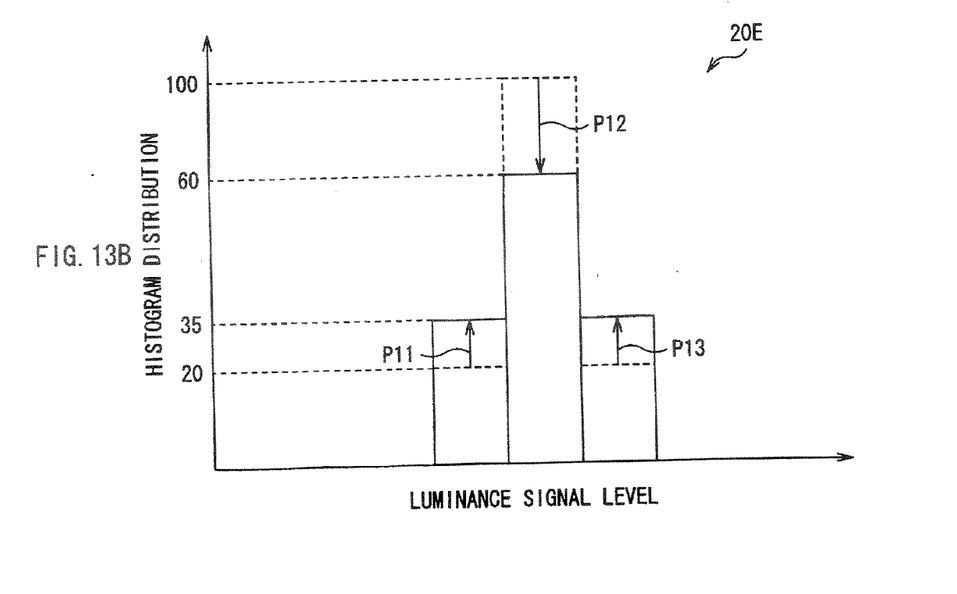

Therefore, when the frequency values in the original luminance level segments are replaced with the weighted average values Ave(left), Ave(middle) and Ave(right) calculated by the formulas (1) through (3), respectively, the luminance distribution 20E shown in FIG. 13B is produced. Compared to the original luminance distribution 20D, in the luminance distribution 20E, as shown by arrows P11 through P13 in the drawing, the frequency value in the luminance level segment on the left increases from 20 to 35, the frequency value in the luminance level segment in the middle decreases from 100 to 60, and the frequency value in the luminance level segment on the right increases from 20 to 35, so it is clear that the concentration of the distribution on the luminance level segment in the middle is reduced, and the distribution is leveled out.

As described above, in the embodiment, the gain producing section 2 includes the leveling section 25 to level out by reducing the concentration of the distribution on a specific luminance level segment, so the gain data Gout can be produced on the basis of the leveled luminance distribution data Hout2, and in addition to the effects in the first or the second embodiment, an unnatural change in image quality due to image processing can be further reduced.

In the embodiment, the case where the leveling section 25 includes either the distribution limiter or the distribution filter is described; however, the leveling section 25 may include the distribution limiter and the distribution filter. More specifically, the distribution limiter limits the frequency value of the luminance distribution to the distribution threshold value HLim or less, and the distribution filter calculates a weighted average value in the luminance distribution data after limiting the frequency value, and replaces the original frequency value with the weighted average value to output the weighted average value. In such a structure, an unnatural change in image quality can be further reduced through the use of the distribution limiter and the distribution filter. They may be arranged in reverse order.

Although the invention is described referring to the first, the second and the third embodiments, the invention is not limited to the embodiments, and can be variously modified.

For example, in the above embodiments, the case where the luminance level in the luminance distributions 20A through 20E is divided into 8 segments (8 gray levels) is described; however, the gain variation control section 23 or the APL detecting circuit 24 may perform the operation of controlling the gain variation ΔGin or the operation of detecting the average picture level APLout according to the number of luminance level segments. Likewise, the distribution limiter or the distribution filter as the leveling section 25 may perform a leveling process according to the number of luminance level segments. More specifically, an unnatural change in image quality due to the concentration of the distribution on a specific luminance level segment is specifically pronounced in the case where the number of luminance level segments is small as described above, so only in the case where the number of luminance level segments is equal to or less than a threshold number, these operations are performed. In such a structure, in the case of the number of luminance level segments in which an unnatural change in image quality is negligible, these operations can be suspended so as to improve the processing speed of the whole image processing.

Moreover, in the above embodiments, the case where the image processing section 3 includes the γ correction circuit 31 is described; however, the structure of the image processing section 3 is not limited to the case, and the image processing section 3 may include, for example, another circuit for image processing, or may include a plurality of such circuits.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a finding means for finding a luminance histogram for every image frame of input image data;
a gain-variation detecting means for detecting a gain variation between image frames on the basis of the found luminance histogram, the gain representing the level of image processing;
a control means for limiting a gain variation in an image frame to a gain variation threshold in the case where the gain variation exceeds the gain variation threshold, and modifying the gain variation so that a portion exceeding the gain variation threshold is carried over to a gain variation in the next image frame; and
an image processing means for performing image processing on the input image data on the basis of the gain variation modified.

2. The image processing apparatus according to claim 1, further comprising:
- an APL (average picture level) variation detecting means for detecting an APL variation between image frames of the input image data,
- wherein the control means changes the threshold level on the basis of an APL variation detected by the APL variation detecting means.

3. The image processing apparatus according to claim 2, wherein
- the control means discretely changes the gain variation threshold in a stepwise manner according to the APL variation.

4. The image processing apparatus according to claim 3, wherein
- the control means sets a gain variation threshold in a first area of APL variation and a gain variation threshold in a second area of APL variation to be smaller than a gain variation threshold in a third area, the third area lying between the first area and the second area, the APL variation in the second area being larger than that in the first area.

5. The image processing apparatus according to claim 1, further comprising:
- a leveling means for leveling out the luminance histogram found by the finding means,
- wherein the gain-variation detecting means detects the gain variation on the basis of the luminance histogram leveled out.

6. The image processing apparatus according to claim 5, wherein
- the leveling means levels out the luminance histogram by limiting the frequency thereof to a frequency threshold.

7. The image processing apparatus according to claim 5, wherein
- the leveling means levels out the luminance histogram by calculating a weighted average value with respect to each of a plurality of successive luminance level segments in the luminance histogram, and then replacing a frequency value at each luminance level segment with the calculated weighted average value.

8. The image processing apparatus according to claim 6, wherein
- the leveling means levels out by calculating a weighted average value with respect to each of a plurality of successive luminance level segments in the luminance histogram, and then replacing a frequency value at each luminance level segment with the calculated weighted average value, as well as limiting the frequency in the luminance histogram.

9. The image processing apparatus according to claim 1, wherein
- the control means modifies the gain variation provided that the number of intensify level segments in the luminance histogram is equal to or less than a threshold number.

10. The image processing apparatus according to claim 1, wherein
- the image processing means includes a γ correction circuit for improving the contrast of the input image data.

11. An image display, comprising:
- a finding means for finding a luminance histogram for every image frame of input image data;
- a gain-variation detecting means for detecting a gain variation between image frames on the basis of the found luminance histogram, the gain representing the level of image processing;
- a control means for limiting a gain variation in an image frame to a gain variation threshold in the case where the gain variation exceeds the gain variation threshold, and modifying the gain variation so that a portion exceeding the gain variation threshold is carried over to a gain variation in the next image frame;
- an image processing means for performing image processing on the input image data on the basis of the gain variation modified, thereby generating a processed image data; and
- a display means for displaying an image on the basis of the processed image data.

12. An image processing method performed on an image processing apparatus, comprising the steps of:
- finding a luminance histogram for every image frame of input image data;
- detecting a gain variation between image frames on the basis of the found luminance histogram, the gain representing the level of image processing;
- limiting a gain variation in an image frame to a gain variation threshold in the case where the gain variation exceeds the gain variation threshold, and modifying the gain variation so that a portion exceeding the gain variation threshold is carried over to a gain variation in the next image frame; and
- performing image processing, on a processor of the image processing apparatus on the input image data on the basis of the gain variation modified.

13. An image processing apparatus, comprising:
- a finding section finding a luminance histogram for every image frame of input image data;
- a gain-variation detecting section detecting a gain variation between image frames on the basis of the found luminance histogram, the gain representing the level of image processing;
- a control section limiting a gain variation in an image frame to a gain variation threshold in the case where the gain variation exceeds the gain variation threshold, and modifying the gain variation so that a portion exceeding the gain variation threshold is carried over to a gain variation in the next image frame; and
- an image processing section performing image processing on the input image data on the basis of the gain variation modified.

14. An image display, comprising:
- a finding section finding a luminance histogram for every image frame of input image data;
- a gain-variation detecting section detecting a gain variation between image frames on the basis of the found luminance histogram, the gain representing the level of image processing;
- a control section limiting a gain variation in an image frame to a gain variation threshold in the case where the gain variation exceeds the gain variation threshold, and modifying the gain variation so that a portion exceeding the gain variation threshold is carried over to a gain variation in the next image frame;
- an image processing section performing image processing on the input image data on the basis of the gain variation modified, thereby generating a processed image data; and
- a display section displaying an image on the basis of the processed image data.

* * * * *